United States Patent [19]
DePorter et al.

[11] Patent Number: 5,932,665
[45] Date of Patent: Aug. 3, 1999

[54] POLYCARBOXY POLYMER ACID BINDERS HAVING REDUCED CURE TEMPERATURES

[75] Inventors: Craig Donald DePorter, Denver; Thomas John Taylor, Englewood, both of Colo.

[73] Assignee: Johns Manville International, Inc., Denver, Colo.

[21] Appl. No.: 08/796,832

[22] Filed: Feb. 6, 1997

[51] Int. Cl.$^6$ ............................................... C08F 8/32
[52] U.S. Cl. ..................... 525/381; 428/290; 428/365; 428/375; 525/329.6; 525/380; 525/382; 525/384; 525/385
[58] Field of Search ..................... 428/290, 365, 428/375; 525/380, 381, 382, 384, 385

[56] References Cited

U.S. PATENT DOCUMENTS

| | | |
|---|---|---|
| 3,658,772 | 4/1972 | Volk et al. . |
| 4,076,691 | 2/1978 | Swift et al. . |
| 5,108,798 | 4/1992 | Guerro et al. . |
| 5,143,582 | 9/1992 | Arkens et al. . |
| 5,318,990 | 6/1994 | Strauss . |
| 5,412,026 | 5/1995 | Holy et al. . |

FOREIGN PATENT DOCUMENTS

| | | |
|---|---|---|
| 0583086 | 7/1992 | European Pat. Off. . |
| 0651088 | 1/1994 | European Pat. Off. . |

*Primary Examiner*—Bernard Lipman
*Attorney, Agent, or Firm*—Robert D. Touslee

[57] ABSTRACT

By carefully adjusting the molecular weight and amounts of methacrylic acid and maleic acid and/or maleic anhydride comonomers in polyacrylic acid-based fiberglass binders, binder-treated fiberglass cured and B-staged product throughput may be maintained at production rates designed for phenol/formaldehyde binders due to the lower thermal requirements for cure as compared to homopolyacrylic acid-based binder systems.

7 Claims, No Drawings

POLYCARBOXY POLYMER ACID BINDERS HAVING REDUCED CURE TEMPERATURES

TECHNICAL FIELD

The subject invention pertains to thermosettable binding resins. More particularly, the subject invention pertains to thermosetting, acrylic acid-based binder resins which cure by crosslinking with a polyfunctional, carboxyl group-reactive curing agent. Such binders are useful as replacements for formaldehyde-based binders in non-woven fiberglass goods.

BACKGROUND ART

Polymeric fiberglass binders have a variety of uses ranging from stiffening applications where the binder is applied to woven or non-woven fiberglass sheet goods and cured, producing a stiffer product; thermoforming applications wherein the binder resin is applied to sheet or lofty fibrous product following which it is dried and optionally B-staged to form an intermediate but yet curable product; and to fully cured systems such as building insulation, wherein the binder is fully cured to its thermoset state while the fiberglass is in the fully expanded condition, following which the rolls or batts are compressed for storage and shipment. In the latter case, it is important that upon releasing the compression, that the batt or roll of fiberglass insulation recover a substantial part of its precompressed thickness.

Polymeric binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Binder resins in these applications perform no translation of fiber strength. Rather, the unique physical properties of these products are related in general to polymer stiffness rather than fiber strength. Fiberglass binders also cannot be equated with paper or wood product "binders" where the adhesive properties are tailored to the chemical nature of the cellulosic substrates. Many such resins, e.g. urea/formaldehyde and resorcinol/formaldehyde resins, are not suitable for use as fiberglass binders. One skilled in the art of fiberglass binders would not look to cellulosic binders to solve any of the known problems associated with fiberglass binders.

From among the many thermosetting polymers, numerous candidates for suitable thermosetting fiberglass binder resins exist. However, binder-coated fiberglass products are often of the commodity type, and thus cost becomes a driving factor, ruling out such resins as thermosetting polyurethanes, epoxies, and others. Due to their excellent cost/performance ratio, the resins of choice in the past have been phenol/formaldehyde resins. Phenol/formaldehyde resole resins can be economically produced, and can be extended with urea prior to use as a binder in many applications. Such urea-extended phenol/formaldehyde resole binders have been the mainstay of the fiberglass insulation industry for years, for example.

Over the past several decades however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol/formaldehyde resole resins, changes in catalysts, and addition of different and multiple formaldehyde scavengers, has resulted in considerable improvement in emissions from phenol/formaldehyde binders as compared with the binders previously used. However, with increasingly stringent Federal regulations, more and more attention has been paid to alternative binder systems which are free from formaldehyde.

One such candidate binder system employs polymers of acrylic acid as a first component, and a polyol such as glycerine or a modestly oxyalkylated glycerine as a curing or "crosslinking" component. The preparation and properties of such poly(acrylic acid)-based binders, including information relative to the VOC emissions, and a comparison of binder properties versus urea formaldehyde binders is presented in "Formaldehyde-Free Crosslinking Binders For Non-Wovens", Charles T. Arkins et al., TAPPI JOURNAL, Vol. 78, No. 11, pages 161–168, November 1995. The binders disclosed by the Arkins article, appear to be B-stageable as well as being able to provide physical properties similar to those of urea/formaldehyde resins. Unfortunately, urea/formaldehyde resins do not in general offer the same properties as phenol/formaldehyde resins, the most widely used fiberglass binder resins.

U.S. Pat. No. 4,076,917 discloses β-hydroxyalkylamides, more particularly bis(β-hydroxyalkylamides) as curing agents for polymers containing carboxyl functionality. Numerous unsaturated monomers are disclosed for preparation of the carboxyl-functional polymer, and copolymers of ethylacrylate/methacrylic acid, and ter- and tetrapolymers of butylacrylate/methylmethacrylate/styrene/methacrylic acid; ethylacrylate/styrene/methacrylic acid; butyl acrylate/methacrylic acid/styrene/maleic anhydride; and ethylacrylate/methylmethacrylate/methacrylic acid are among the carboxylic acid group-containing polymers exemplified.

U.S. Pat. No. 5,108,798 discloses water soluble binders prepared from polyfunctional carboxylic acids and β-hydroxyurethanes. Among the polycarboxylic acids, preference is given to monomeric polycarboxylic acids such as the cycloalkane tetracarboxylic acids and anhydrides, pyromellitic acid and its anhydride, and maleic acid and its anhydride. Polymaleic acid and polymaleic anhydride are also identified. Poly(acrylic acids) are exemplified as not producing cured products with good tensile strength.

U.S. Pat. No. 5,143,582 discloses heat resistant non-wovens containing ammonia-neutralized polycarboxylic acids, either monomeric or polymeric, and β-hydroxyalkyl amides. High molecular weight poly(acrylic acid) is shown to be superior to low molecular weight poly(acrylic acid) in these applications. Apparent cure temperature is 204° C. However, the binder compositions are believed to liberate ammonia upon cure. Ammonia emissions are becoming increasingly tightly regulated.

U.S. Pat. No. 5,318,990 discloses fiberglass insulation products cured with a combination of a polycarboxy polymer, a β-hydroxyalkylamide, and an at least trifunctional monomeric carboxylic acid such as citric acid. No polycarboxy polymers other than poly(acrylic acid) are disclosed, although co- and terpolymer polycarboxy acids are broadly disclosed.

Published European Patent Application EP O 583 086 A1 appears to provide details of polyacrylic binders whose cure is catalyzed by a phosphorus-containing catalyst system as discussed in the Arkens article previously cited. European Published Application EP O 651 088 A1 contains a related disclosure pertaining to cellulosic substrate binders. The fiberglass binders of EP '086 are partially neutralized polycarboxy polymers and hydroxyl-functional curing agents wherein the polycarboxy polymers are prepared in the presence of sodium hypophosphite, incorporating the latter into the polymer structure or by incorporating sodium hypophosphite separately into the curable mixture of polycarboxy polymers to serve as the curing catalyst. Terpolymers of acrylic acid, maleic acid, and sodium hypophosphite are exemplified but appear to reduce both dry and wet tensile strength as compared to poly(acrylic acid) catalyzed with sodium hypophosphite. Higher molecular weight poly (acrylic acids) are stated to provide polymers exhibiting more complete cure. Under the same conditions, copolymers of acrylic acid and maleic acid are shown to have less complete cure as shown by the swell ratios of the polymers, and the copolymer with higher maleic acid content fared worse in this comparison.

Further, and most importantly, as Arkens indicates, the normal cure temperature of the acrylic binder resins is approximately 180° C., and a final cure does not take place without prolonged heating at this temperature or by allowing the temperature to rise to the range of 220° C. to 240° C. The combination of curing temperature and cure time necessitates thermal energy requirements considerably in excess of what is normally desirable for phenol/formaldehyde resins. While it might seem that a simple increase in furnace temperature could provide the additional thermal energy required, it must be remembered that in a commercial setting, the exceptionally large furnaces, powerful heat supplies, and ancillary equipment must all be changed if a binder with higher thermal energy curing requirements is to be used. These changes are not minimal, and represent a considerable financial investment, in many cases requiring significant additional furnace length. Moreover, it is highly likely that for a considerable period of time at least, a variety of binder resins may be used on the same line at different times. Thus, any change made to the curing ovens must be easily reversible. Thus, poly(acrylic acid) binder systems having curing energy requirements similar to those of phenol/formaldehyde binders would be desirable.

The cure temperatures and rates of cure are believed to be dependent upon a number of factors. These, of course, include the reactivity of the carboxylic acid and polyol and the presence and type of esterification catalyst present. The poly(acrylic acid) polymer and the polyol together contain far more theoretical crosslinking possibilities than is believed necessary to provide the necessary crosslinking to attain a thermoset binder. It is believed that a significant fraction of carboxylic acid groups from the poly(acrylic acid) and hydroxyl groups from the polyol in fact do not esterify, but remain unreacted in the thermoset product. One of the reasons for the difficulty of esterification of poly (acrylic acid) carboxylic acid groups and polyol hydroxyl groups is that poly(acrylic acid) is believed to form self-associating discrete phases upon loss of water solvent, possibly to the exclusion of the polyol present. Crosslinking via esterification can then only occur when sufficient thermal energy is present to disrupt these discrete phases. Such molecular disruption may occur solely via thermally-induced molecular motions, and/or by a change in the poly(acrylic acid) molecule caused by internal anhydride formation between neighboring carboxylic acid groups.

SUMMARY OF THE INVENTION

It has now been surprisingly discovered that cure temperatures of polycarboxy polymer binders can be significantly lowered through incorporation of maleic acid and/or maleic anhydride into the polycarboxy polymer, and operating on the lower apparent molecular weight end of the 20–100 KDa range. By these methods, curing temperatures can be lowered from c.a. 180° C. to temperatures less than 140° C. As a result, the suitability of polyacrylic acid binders as replacements for phenol/formaldehyde and other formaldehyde-based resins in current commercial operations is enhanced.

BRIEF DESCRIPTION OF THE DRAWINGS

FIG. 1 is a DMA plot illustrating the temperatures associated with the onset and terminus of cure.

FIG. 2 is a DMA plot illustrating a two-step cure.

DETAILED DESCRIPTION OF THE PREFERRED EMBODIMENTS

The polycarboxy polymers useful in the binder systems of the present invention comprise minimally 20 weight percent of polymerized poly(acrylic acid) moieties and at least 10 weight percent of maleic acid and/or maleic anhydride moieties. Other polymerizable monomers, i.e. styrene, acrylonitrile, and the like may also be present. In general, the higher the content of acrylic acid, methacrylic acid, maleic anhydride, and maleic acid, the higher the theoretical crosslink density of the thermosetting resin system. If a resin system with less than the highest degree of crosslinking is desired, non-crosslinkable monomers such as styrene, acrylonitrile, methylacrylate, and methylmethacrylate, may be added. The polymerization of the monomers preferably occurs in aqueous solution, for example by the methods disclosed in U.S. Pat. Nos. 3,658,772 and 5,412,026.

A study was initiated to examine the effects of polymer composition, molecular weight, and polyol and esterification catalyst levels in a series of copolymers and terpolymers produced by the aqueous polymerization of acrylic acid, methacrylic acid, and maleic acid utilizing a free radical polymerization initiator. The polmerizations were carried out at 50% solids and some of the vessels actually were gelled after the polymerization was complete. Although the gels were due to high molecular weight and not crosslinking (they were still soluble), all effects attributed to molecular weight were suspect due to a probable Tromsdorff effect.

Molecular weight determination was done using a Waters HPLC with an Ultrahydrogel linear column (Waters). Water, raised to pH 10 with sodium hydroxide, was employed as the mobile phase. Reported molecular weights are apparent number average molecular weights versus poly(sodium methacrylate) narrow standards (Polysciences) using Millenium 2010 software for data reduction and a linear calibration curve. The molecular weights determined by this method are actually believed to be lower than the actual molecular weights. The term "apparent" used herein and in the claims is reflective of molecular weight measurement as described herein, in other words, at pH 10 versus poly (sodium methacrylate) standards, a method of measurement easily performed by those skilled in the art.

Cure profiles were measured using a Polymer Laboratories, Inc. Model DMTA III Dynamic Mechanical Analyzer (DMA). The binders were impregnated in Whatman microfiberglass filter paper strips, about 0.27 grams of binder solution on two strips about 20 millimeters by 7 millimeters in dimension. The strips were then laminated and clamped into the DMA. Dynamic moduli were measured from 80° C. to 300° C. at 4° C./minute in air. The onset and completion of cure were determined as shown in FIG. 1. The cure evaluations were done in random order.

The cure profiles were characterized by an onset and a terminus of cure. The interpretation of several DMA scans was problematic due to an apparent two-stage cure in many of the formulations containing maleic acid. It was possible, therefore, that some residual free maleic acid monomer was contained in those formulations which contributed to the observed phenomenon. An experiment was conducted to examine the affects of free maleic acid on the cure profile of a polycarboxypolymer/glycerol system. A commercial poly (acrylic acid) was blended with maleic acid at a weight ratio of 1:0.5 and cured with glycerol at a carboxyl:hydroxyl mol ratio of approximately 1:1. DMA showed a two-step cure (FIG. 2) for this system with the first cure being complete at approximately 210° C. followed by a second at 260° C. The poly(acrylic acid) binder cured with glycerol and no maleic acid typically has a cure terminus of approximately 210° C., and it thus appeared that the free residual maleic acid was responsible for further increasing modulus by crosslinking through the unsaturation present. Therefore, when there were two apparent cures in the DMA scan, the first one was considered the "true" cure with respect to analysis of the experimental data.

This study indicated that higher catalyst levels, near stoichiometric polyol, and lower molecular weight favored lower cure temperatures. However, the molecular weight effects were suspect as mentioned earlier.

However, as a result of some of these uncertainties thought present in the first experimental campaign, in a second experimental campaign, a more accurate limitation of molecular weight was achieved through the addition of a chain transfer agent, isopropanol. A potassium persulfate/sodium bisulfite redox-free radical initiator system was employed. The polymerizations were conducted in septum-sealed 20 mL test tubes with no attempt to deoxygenate reagents or reaction tubes. The correct amount of water for 80 mL of each of the three solvent mixtures was added to a polymerization tube. The initiator was dissolved in the water followed by addition of the chain transfer agent. Sodium bisulfite was then added to the solutions and dissolved. The test tubes were charged with 8 mL of the solvent/initiator/sodium bisulfite mixtures, and the desired monomer amounts added. The tubes were septum sealed and placed into a convection oven at 60° C.±5° C. After three hours, the oven was turned off and the tubes allowed to cool to room temperature slowly overnight inside the oven.

The septa were removed from the test tubes and the contents were transferred to scintillation vials. Catalyst and polyol was then added. If necessary, small amounts of methanol were added to reduce viscosity and assist in homogenation. In some cases, the vials were warmed with hot water for the same reason. The curable binder was added to glass fiber filter strips as before. In the second set of polymerizations, the solids content was approximately 20% instead of 50%. As a result of the lower solids content, the viscosity of the polymer solutions were significantly lower than those in the first campaign, and thus, the Tromsdorff effect was not believed operable. In the second campaign, the initiator level was kept constant at 3 parts per 100 parts of monomer (phm), and sodium bisulfite was used as a redox catalyst for the initiator at 1.5 phm. The charges for campaign 2 are presented in Table 1. In the Table, AA is acrylic acid, MA is methacrylic acid, MaA is maleic acid weight fractions as charged, and iPA is isopropanol. The columns identified as X-AA, X-MA, and X-MaA are the inferred polymer compositions in weight fractions, based on analysis of residual, unreacted monomers in the polymerization vials.

TABLE 1

Experimental Design and Measured Responses

| Trial | Run Order[a] | AA | MA | MaA | X-AA | X-MA | X-MaA | iPA[b] | Onset[c] | Final[c] | Mw/Mn | Mn | Mw |
|---|---|---|---|---|---|---|---|---|---|---|---|---|---|
| 1 | 15 | 0 | 0.5 | 0.5 | 0 | 0.659 | 0.341 | 50 | 171 | 237 | 2.41 | 60,000 | 144,000 |
| 2 | 16 | 0 | 0.5 | 0.5 | 0 | 0.619 | 0.381 | 125 | 176 | 199 | 2.49 | 50,000 | 125,000 |
| 3 | 14 | 0 | 0.5 | 0.5 | 0 | 0.610 | 0.390 | 200 | 168 | 192 | 2.40 | 46,000 | 111,000 |
| 4 | 1 | 0 | 1 | 0 | 0 | 1 | 0 | 50 | 174 | 205 | 2.36 | 38,000 | 89,000 |
| 5 | 17 | 0 | 1 | 0 | 0 | 1 | 0 | 125 | 174 | 207 | 2.54 | 26,000 | 66,000 |
| 6 | 5 | 0 | 1 | 0 | 0 | 1 | 0 | 200 | 172 | 195 | 2.46 | 30,000 | 73,000 |
| 7 | 8 | 0.5 | 0 | 0.5 | 0.621 | 0 | 0.379 | 50 | 153 | 182 | 2.32 | 35,000 | 81,000 |
| 8 | 12 | 0.5 | 0 | 0.5 | 0.619 | 0 | 0.381 | 125 | 146 | 177 | 2.00 | 26,000 | 51,000 |
| 9 | 10 | 0.5 | 0 | 0.5 | 0.609 | 0 | 0.390 | 200 | 145 | 174 | 2.14 | 25,000 | 53,000 |
| 10 | 9 | 1 | 0 | 0 | 1 | 0 | 0 | 50 | 144 | 197 | 2.48 | 33,000 | 81,000 |
| 11 | 11 | 1 | 0 | 0 | 1 | 0 | 0 | 125 | 141 | 200 | 2.32 | 26,000 | 60,000 |
| 12 | 7 | 1 | 0 | 0 | 1 | 0 | 0 | 200 | 145 | 202 | 2.34 | 25,000 | 58,000 |
| 13 | 18 | 0 | 0.75 | 0.25 | 0 | 0.527 | 0.473 | 50 | 180 | 222 | 2.13 | 56,000 | 120,000 |
| 14 | 3 | 0 | 0.75 | 0.25 | 0 | 0.550 | 0.449 | 125 | 175 | 216 | 2.52 | 33,000 | 83,000 |
| 15 | 19 | 0 | 0.75 | 0.25 | 0 | 0.552 | 0.448 | 200 | 177 | 226 | 2.28 | 39,000 | 88,000 |
| 16 | 4 | 0.75 | 0 | 0.25 | 0.521 | 0 | 0.479 | 50 | 146 | 178 | 2.47 | 30,000 | 73,000 |
| 17 | 20 | 0.75 | 0 | 0.25 | 0.626 | 0 | 0.374 | 125 | 142 | 169 | 2.25 | 34,000 | 76,000 |
| 18 | 3 | 0.75 | 0 | 0.25 | 0.628 | 0 | 0.372 | 200 | 139 | 170 | 2.04 | 21,000 | 44,000 |
| 19 | 2 | 0.5 | 0.5 | 0 | 0.499 | 0.500 | 0 | 50 | 144 | 197 | 2.51 | 44,000 | 110,000 |
| 20 | 21 | 0.5 | 0.5 | 0 | 0.488 | 0.512 | 0 | 125 | 149 | 189 | 2.44 | 28,000 | 68,000 |
| 21 | 6 | 0.5 | 0.5 | 0 | 0.472 | 0.528 | 0 | 200 | 148 | 194 | 2.44 | 26,000 | 65,000 |
| 22 | 22 | 0.25 | 0.25 | 0.5 | 0.379 | 0.381 | 0.240 | 50 | 150 | 181 | 2.53 | 35,000 | 88,000 |
| 23 | 23 | 0.25 | 0.25 | 0.5 | 0.374 | 0.380 | 0.245 | 125 | 155 | 181 | 2.44 | 31,000 | 76,000 |
| 24 | 24 | 0.25 | 0.25 | 0.5 | 0.371 | 0.381 | 0.247 | 200 | 146 | 173 | 2.43 | 30,000 | 72,000 |
| 25 | 25 | 0.375 | 0.375 | 0.25 | 0.350 | 0.350 | 0.300 | 50 | 152 | 220 | 2.59 | 51,000 | 131,000 |
| 26 | 26 | 0.375 | 0.375 | 0.25 | 0.362 | 0.415 | 0.222 | 1 | 144 | 168 | 2.56 | 33,000 | 84,000 |

[a]Order that the DMA experiments were run.
[b]iPA = 2-propanol used as the chain transfer agent in PHM. Balance of 400 PHM made up water.
[c]Measured onset and terminus of cure, °C.

The polymers were cured with glycerol and sodium hypophosphite hydrate as an esterification catalyst. The onset and completion of cure are shown as measured in Table 1.

TABLE 2

Best Candidates From Predictive Equations
(Weight Fractions Monomer as Charged)

| Row | AA | MA | MaA | ipA[a] | Onset[b] | Final[b] |
|---|---|---|---|---|---|---|
| 1 | 0.35 | 0.15 | 0.5 | 200 | 146 | 169 |
| 2 | 0.4 | 0.1 | 0.5 | 162 | 147 | 169 |
| 3 | 0.4 | 0.1 | 0.5 | 181 | 145 | 167 |
| 4 | 0.4 | 0.1 | 0.5 | 200 | 144 | 166 |
| 5 | 0.45 | 0.05 | 0.5 | 125 | 147 | 169 |
| 6 | 0.45 | 0.05 | 0.5 | 144 | 146 | 167 |
| 7 | 0.45 | 0.05 | 0.5 | 162 | 145 | 165 |
| 8 | 0.45 | 0.05 | 0.5 | 181 | 144 | 164 |
| 9 | 0.45 | 0.05 | 0.5 | 200 | 142 | 162 |
| 10 | 0.45 | 0.1 | 0.45 | 162 | 146 | 170 |
| 11 | 0.45 | 0.1 | 0.45 | 181 | 145 | 169 |
| 12 | 0.45 | 0.1 | 0.45 | 200 | 143 | 168 |
| 13 | 0.5 | 0 | 0.5 | 106 | 146 | 169 |
| 14 | 0.5 | 0 | 0.5 | 125 | 145 | 166 |
| 15 | 0.5 | 0 | 0.5 | 144 | 145 | 164 |
| 16 | 0.5 | 0 | 0.5 | 162 | 144 | 162 |
| 17 | 0.5 | 0 | 0.5 | 181 | 142 | 161 |
| 18 | 0.5 | 0 | 0.5 | 200 | 141 | 159 |
| 19 | 0.5 | 0.05 | 0.45 | 144 | 145 | 169 |
| 20 | 0.5 | 0.05 | 0.45 | 162 | 144 | 167 |
| 21 | 0.5 | 0.05 | 0.45 | 181 | 143 | 166 |
| 22 | 0.5 | 0.05 | 0.45 | 200 | 142 | 165 |
| 23 | 0.5 | 0.1 | 0.4 | 200 | 143 | 170 |
| 24 | 0.55 | 0 | 0.45 | 125 | 145 | 168 |
| 25 | 0.55 | 0 | 0.45 | 144 | 144 | 166 |
| 26 | 0.55 | 0 | 0.45 | 162 | 143 | 164 |
| 27 | 0.55 | 0 | 0.45 | 181 | 142 | 163 |
| 28 | 0.55 | 0 | 0.45 | 200 | 141 | 162 |
| 29 | 0.55 | 0.05 | 0.4 | 162 | 144 | 169 |
| 30 | 0.55 | 0.05 | 0.4 | 181 | 143 | 168 |
| 31 | 0.55 | 0.05 | 0.4 | 200 | 142 | 168 |
| 32 | 0.6 | 0 | 0.4 | 144 | 144 | 168 |
| 33 | 0.6 | 0 | 0.4 | 162 | 143 | 167 |
| 34 | 0.6 | 0 | 0.4 | 181 | 142 | 166 |
| 35 | 0.6 | 0 | 0.4 | 200 | 141 | 166 |
| 36 | 0.65 | 0 | 0.35 | 162 | 143 | 170 |
| 37 | 0.65 | 0 | 0.35 | 181 | 142 | 169 |
| 38 | 0.65 | 0 | 0.35 | 200 | 141 | 169 |

[a]iPA = 2-propanol used as chain transfer agent in PHM, balance of 400 PHM water.
[b]Predicted onset and terminus of cure, °C.

TABLE 3

Test Points
Measured and Predicted Cure Behaviors
200 PHM ipA, Stoichiometric Glycerol, 10 phb Catalyst

| AA | MA | MaA | Onset (°C.) | | Final (°C.) | |
|---|---|---|---|---|---|---|
| (wt. Frac) | (wt. Frac) | (wt. Frac) | Measured | Predicted | Measured | Predicted |
| 0.5 | 0 | 0.5 | 143 | 141 | 177 | 159 |
| 0.65 | 0 | 0.35 | 140 | 141 | 176 | 169 |
| 0.75 | 0 | 0.25 | 141 | 141 | 173 | 177 |
| 0.375 | 0.375 | 0.25 | 146 | 141 | 201 | 186 |

The results of the heretofore-described experimentation indicate that addition of maleic acid- and/or maleic anhydride-derived moieties to a polycarboxy polymer acid component of a curable binder system is effective in lowering the curing temperature significantly. Without wishing to be bound to any particular theory, applicants believe that the vicinal carboxylic acid groups of maleic acid tend to prevent or minimize the self-associating discrete phases which poly(acrylic acid) polymers may otherwise adopt, thus increasing the likelihood of esterification without requiring disruption of the inter- and intramolecular order by thermal energy. The effect of maleic acid on cure temperature is far greater than any effect which might be attributed to the number of carboxy groups, a factor which might affect the ultimate crosslink density but should not greatly affect cure temperature.

It has been further discovered that faster cures can be achieved by lowering the molecular weight of the polycarboxy polymers to below about $6 \times 10^4$ Da (Daltons), preferably below $5 \times 10^4$ Da, and most preferably below $3 \times 10^4$ Da relative to poly(sodium methacrylate) standards. Molecular weights expressed herein are apparent number average molecular weights versus poly(sodium methacrylate) standards unless otherwise specified. Limiting the molecular weight of the polymer may be achieved by traditional methods, i.e. through addition of increased levels of initiator and/or chain transfer agent. Suitable chain transfer agents are those generally known to those skilled in the art of vinyl polymerization, e.g. isopropanol, 2-butanol, t-butanol, toluene, n-dodecylmercaptan, trichloroiodomethane, and the like. The effect of decreased molecular weight is not as great in lowering curing temperature as the effect of incorporating maleic acid. However, the effect is significant nevertheless. Without wishing to be bound to any particular theory, the effect of decreased molecular weight in lowering cure temperature is believed due to increased molecular mobility.

The polycarboxylic polymers of the subject invention include minimally 20 weight percent acrylic acid, preferably 40–70 weight percent acrylic acid, and most preferably about 55 to 65 weight percent acrylic acid. "Acrylic acid" and other monomers referred to herein in weight percent are the weight percent of monomers reacted relative to total monomers.

The polycarboxylic polymers contain minimally 5 weight percent maleic acid and/or maleic anhydride, preferably from 20 weight percent to about 60 weight percent or more, and more preferably from about 30 weight percent to about 50 weight percent.

The polycarboxylic polymers may contain methacrylic acid in minor quantity. However, the methacrylic acid should be present in not more than 30 weight percent, and regardless of actual amount, should not exceed 70 percent w/w of the amount of acrylic acid utilized.

Most preferably, the polycarboxy polymers are composed substantially of the polymerized residues of acrylic acid, maleic acid and/or maleic anhydride, and optionally methacrylic acid. However, it is also possible to add minor quantities, not to exceed 50 weight percent of the total monomer charge, of one or more non-carboxyl functional molecules, i.e. styrene, α-methylstyrene, p-methylstyrene, methylmethacrylate, acrylonitrile, and the like. Other unsaturated carboxylic acids and poly(carboxylic acids) may also be used. With respect to additional unsaturated carboxylic acids, i.e. itaconic acid, methylmaleic acid, and the like, the amounts employed may be greater than 50 weight percent of all monomers.

The curing component of the subject modified polycarboxy polymer binders include polyfunctional carboxylic acid- and/or carboxylic acid anhydride-reactive functionalities such as hydroxyl, amino, epoxy, and the like. Preferably, however, the reactive functionality is hydroxyl functionality, i.e. the curing component is a polyol. Suitable polyols include but are not limited to glycerol, triethanolamine, trimethylolpropane, pentaerythritol, sorbitol, tetrakis[2-hydroxyalkyl]ethylene diamines, poly(vinyl alcohol), partially hydrolyzed polyvinylacetate, and the like.

The compositions of the subject application in general require a catalyst for cure to occur at relatively low temperature. In the case of cure by esterification with hydroxyl groups, suitable catalysts are the known esterification and transesterification catalysts. Examples are metal naphthenates, cobaltates, vanadates, tertiary amines, etc. A preferred esterification catalyst is an alkali metal hypophosphite. Lists of suitable catalysts may be found in the references previously cited, which are incorporated herein by reference. In the case of other reactive functionalities, i.e. curing with amino-functional compounds to form amide or imide linkages, catalysts which promote amidization or imidization may be employed. Such catalysts are well known to the artisan skilled in amidization and/or imidization reactions.

While the best mode for carrying out the invention has been described in detail, those familiar with the art to which this invention relates will recognize various alternative designs and embodiments for practicing the invention as defined by the following claims.

What is claimed is:

1. A process for increasing the throughput of a polyacrylic acid-based binder-treated fiberglass cured or B-staged product, comprising:

selecting as a binder a modified polyacrylic acid-based binder having moieties derived from acrylic acid and maleic acid and an apparent number average molecular weight of less than 60,000 Da, such that the onset of cure measured by DMA at a temperature ramp of 4° C./min. is below about 155° C. and the terminus of cure measured under the same conditions is less than about 200° C.

2. The process of claim 1 wherein said binder comprises the admixture or curable reaction product thereof of a) a modified polyacrylic acid polymer comprising from about 30 percent to 100 percent acid-functional monomers selected from the group consisting of:
  a)i) about 30 to 85 weight percent acrylic acid,
  (a)ii) about 1 to about 20 weight percent methacrylic acid, and
  a)iii) about 20 to about 70 weight percent maleic acid and/or maleic anhydride, and
  a)iv) mixtures thereof,
said weight percents based on the total moles of acid-functional monomers, any non-acid functional monomers comprising one or more copolymerizable, unsaturated, compatible monomers;

b) one or more polyfunctional, carboxylic acid group-reactive curing agent(s);

c) an effective amount of a catalyst which promotes the reaction between carboxylic acid groups and said carboxylic acid group-reactive curing agent.

3. The process of claim 1 wherein said binder comprises a) an acid-functional polymer comprising from 30 to 100 percent moieties derived from polymerization of unsaturated monomers selected from the group consisting of:
  a)i) from about 35 weight percent to about 75 weight percent acrylic acid-derived moieties,
  a)ii) from 0 to about 20 weight percent methacrylic-derived moieties;
  a)iii) from 25 weight percent to about 70 weight percent maleic acid-derived moieties and/or maleic anhydride-derived moieties; and
  a)iv) mixtures thereof,
with the proviso that at least a)i) and a)iii) must be present, and any non-acid-functional monomers comprise copolymerizable compatible monomers, said weight percents based on the moles of total acid-functional polymer;

b) a curing agent bearing a plurality of reactive functionalities reactive with a carboxylic acid group;

c) an amount of a catalyst effective to catalyze the reaction between said carboxylic acid groups of said acid-functional polymer and said curing agent.

4. The process of claim 3 wherein said acid functional polymer has an apparent number average molecular weight between about 20,000 Da and 60,000 Da.

5. The process of claim 3 wherein said acid functional polymer has an apparent number average molecular weight between about 20,000 Da and 30,000 Da.

6. The process of claim 1, wherein the modified polyacrylic acid-based binder has an apparent number average molecular weight of less than 50,000 Da.

7. The process of claim 1, wherein the modified polyacrylic acid-based binder has an apparent number average molecular weight of less than 30,000 Da.

* * * * *